United States Patent [19]

Melvin, Jr. et al.

[11] 3,906,484

[45] Sept. 16, 1975

[54] DECODER INPUT CIRCUIT FOR RECEIVING ASYNCHRONOUS DATA BIT STREAMS

[75] Inventors: Waymon A. Melvin, Jr., Erwin; George W. Lipscomb, Raleigh, both of N.C.

[73] Assignee: Westinghouse Electric Corporation, Pittsburgh, Pa.

[22] Filed: Sept. 13, 1972

[21] Appl. No.: 288,863

[52] U.S. Cl.... 340/347 DD; 179/15 BA; 179/15 BS; 178/69.5 R

[51] Int. Cl.² ........................ H04J 3/06; H04L 7/02

[58] Field of Search ......... 340/347 DD; 179/15 BA, 179/15 BS; 178/69.5 R

[56] References Cited

UNITED STATES PATENTS 3,447,147 5/1969 Deregnaucourt............... 179/15 BA
3,591,722 7/1971 Palsa.............................. 179/15 BA
3,668,645 6/1972 Reymond........................ 179/15 BA

*Primary Examiner*—Malcolm A. Morrison
*Attorney, Agent, or Firm*—R. W. Smith

[57] ABSTRACT

A decoder input circuit has a continuous mode of operation to receive an asynchronous data bit stream having isochronous data bits. An internal clocking arrangement is synchronized with the start bit of each of a continuous series of data words included in the stream. Each data word bit is clocked into a temporary storage register for readout to a decoder. The storage register is cleared at the end of each data word and the cycle is repeated as a start bit logic is received following the end bit logic. When a start bit logic is not received, the storage register continues to be loaded with the number of data bit intervals included in each data word so that the input circuit is recycled for resynchronizing with the next following start bit. The input circuit is maintained in coincident operation in the event that a start bit is missed.

9 Claims, 3 Drawing Figures

DECODER INPUT CIRCUIT FOR RECEIVING ASYNCHRONOUS DATA BIT STREAMS

BACKGROUND OF THE INVENTION

When transmitting data in continuous serial binary encoded data words, it is necessary to identify and synchronize the decoding station with each data word being received. In certain types of asynchronous data transmission, the data clocking system at the decoding station includes an internal clock pulse source having a frequency which matches the rate at which the data bit intervals are transmitted. The clocking pulses can be counted to correspondingly count the bit intervals of each data word and therefore remain in synchronization with each data word of the received data bit stream. In asynchronous data transmissions, generally, it is also known to encode the first or start bit interval in one logic state, for example, a "1" bit, and the end bit interval with the opposite logic state, for example a "0" bit with the information of each transmitted data word being encoded between the start and end bits. The end bit intervals can be made to have a time duration greater than that of the data word bits, however, when they are the same duration the data bits are isochronous and this data transmission is referred to herein as an isochronous type of asynchronous data transmission. When a large predetermined number (M) of data words is being transmitted the total bit stream includes the number of data words times the number of bit intervals (N) in each word which may be expressed as M × N bits comprising a bit stream. When the bit stream includes several thousand bits it is possible that a start bit may be missed or when the rate at which the bit stream is transmitted is varied causing a phase shift of the start bit it is possible that the following transmitted data words may be lost at the decoding station. Also, if the internal clock is synchronized to a data bit interval which is not at the start bit interval the subsequent transmitted data words are erroneously decoded. It is therefore desirable to have a data clocking system in the input circuit at a decoding station which remains synchronized with the serial isochronously transmitted data words and can be resynchronized with the received data words in the event a start bit logic fails to resynchronize the internal clock.

SUMMARY OF THE INVENTION

In accordance with this invention, a data clocking system for the input circuit of a decoding station receiving an isochronous type of asynchronously transmitted data bit stream is provided with a synchronizing pulse generator having an enabling circuit input which is operable at the beginning of each start bit interval of a data word. An internal clock has a frequency substantially corresponding to the rate at which the data bit intervals are transmitted. A clock counter counts the N bit intervals of a data word and thereupon triggers the enabling circuit so that a synchronizing pulse is generated with each start bit logic being received at the start bit interval. The synchronizing pulse is only triggered when a start bit logic follows the opposite logic state of an end bit interval during a predetermined enabling time period. The data word is clocked into a storage register under control of the clock counter. The clock counter signals the end of the data word storage for readout to a decode circuit and clears the storage register for the next data word and resets the clock counter.

Upon reaching the enabling time period and in the absence of a start bit logic, the synchronizing pulse is not generated. The clock generator continues to run and the clock counter begins counting the next word bit intervals. The logic of each data bit interval appearing at the storage register is clocked in. At the end of the data word interval the circuit is again reset so that the next start bit logic of a data word will again initiate a synchronizing pulse to synchronize the clock pulse generator and the storage register read-in of the data bit stream.

It is a general feature of this invention to provide a clocking system for a decoder input circuit receiving an isochronous type of asynchronously transmitted data bit stream by synchronizing an internal clock pulse generator with the transition between the end bit logic of a preceding data word and the start bit logic of a following data word and wherein the data bit intervals for a data word not commencing with the normal end bit and start bit logic transition are continued to be read into a receiving storage register by the clock pulse generator without being resynchronized. A further feature of this invention includes alternative modes of operation either in a continuous data clocking mode when receiving an isochronous data bit stream or in a start-stop data clocking mode when receiving an asychronous data bit stream where the end bits are longer than one data bit interval.

DESCRIPTION OF THE PREFERRED EMBODIMENT

Figure 1:
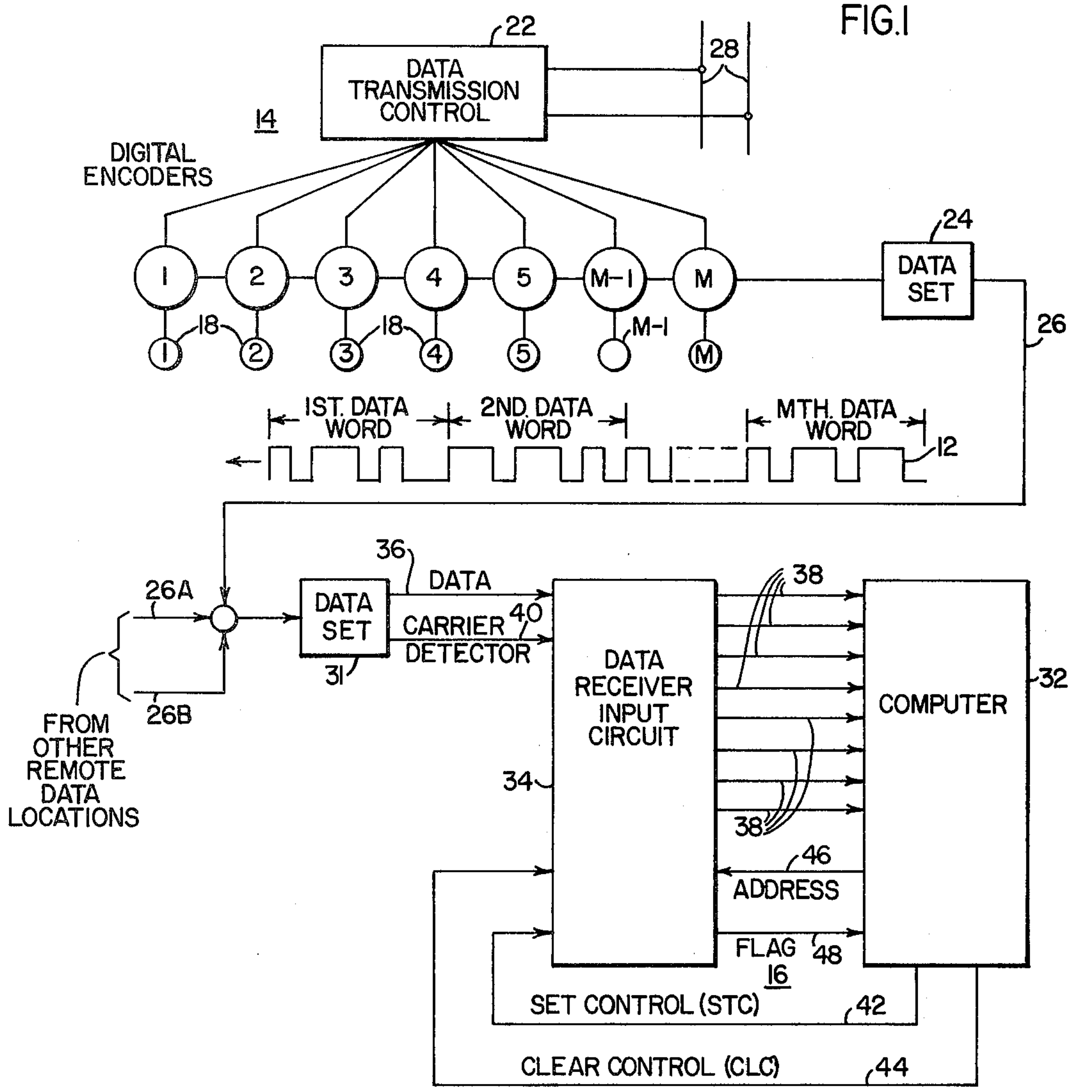
FIG. 1 is a block circuit diagram of a data transmission system including a decoder input having a data receiving circuit made in accordance with this invention.

FIG. 1 is a block circuit diagram of a data transmission system 10 for transmitting a data bit stream 12 between a remote data encoding location 14 and a central data decoding location 16. A group of M number of utility meters 18 indicate measured information which is encoded into a binary data word format by digital encoders 20 each associated with one of the meters 18. Under control of a data transmission control circuit 22 the encoded meter information is transmitted in a serial asynchronous mode from a data set at the remote location 14 to a transmission line 26. The frequency at which the data bit stream is transmitted is controlled by the 60 hertz frequency of a commercially available power source power line 28.

The data bit stream 12 includes data words which are transmitted in a continuous stream of data bit intervals where each data word includes N bit intervals. For purposes of illustration the data words in the illustrated data bit stream 12 include eight bit intervals, however, in a preferred embodiment the data words include 16 bit intervals as described in detail hereinbelow. Each data word in the bit stream 12 includes a start bit interval which is always encoded in the 1 logic state and an end bit interval which is encoded at the 0 logic state. There are M number of data words in the bit stream 12 corresponding to the M number of meters requiring encoded data transmission. Accordingly, the information associated with each of the meters 18 is encoded between the start and end bits of the associated meter data word.

Each word is then distinguished in the data bit stream by a 0 end bit and a 1 start bit. Since there is no clocking pulses transmitted with the data bit stream 12 this type of transmission as understood by those skilled in the art to be of the asynchronous mode of data transmission. This is distinguished from a synchronous mode of transmission where the data bit intervals of a data bit stream are synchronized with clocking pulses which are transmitted along with the information bearing bits. Further, in an isochronous transmission mode each data bit interval has an identical period or duration. When variations occur in the interval between adjacent data words, as provided when the end bit is two or three bit intervals, for example, the more general type of asynchronous transmission is provided. This invention is capable of receiving either type as described below. At the central data decoding location 16 the transmission line 26 is terminated along with similar transmission lines 26A and 26B from other remote data encoding locations at a receiving data set 31. Typically, the data sets 24 and 31 are connected to a telephone type of transmission line 26 and transmit the binary coded data by means of frequency tones which are converted back to two-state binary signals having either of two voltage levels, for example, a predetermined positive voltage level for the 1 data bit logic state and a less positive or substantially zero voltage level for the 0 data bit logic state. At the central location 16 a data decoder, for example, a digital computer 32 is provided for receiving the meter encoded information in a parallel format that is transmitted in the serial format of the bit stream 12. The computer 32 decodes the meter information of each data word into a useful readout for use, for example, in billing customers of the utility meters 18.

A data receiving input circuit 34 is connected to the input of the computer 32 to demultiplex and condition each data word logic which is multiplexed in a time division like serial fashion in the data bit stream 12. The data bits of each data word are received on a data input line 36 in the series isochronous or more general asynchronous transmitted format and are stored in a parallel data bit format for read in on the lines 38 to the input of the computer 32. The data receiving input circuit 34 of this invention includes an additional input line 40 for receiving a carrier detector logic signal from the data set 31. This signal originates in the received line signal detector circuit of data set 31 when the data set 24 indicates that a communication link has been established. Also, the computer 32 transmits a set control signal (STC) on line 42 and a clear control signal (CLC) on a line 44 to signal the input circuit 34 when the computer 32 is ready to receive information. An address signal line 46 from the computer 32 provides an enabling pulse to address or select a computer input from the input circuit 34 when the computer is ready for the data bit readout on the lines 38. A flag signal output on line 48 is generated from the input circuit 34 to the computer 32 to indicate that the data word logic on the lines 38 is completed and ready for read in into the computer 32.

Figure 2A:
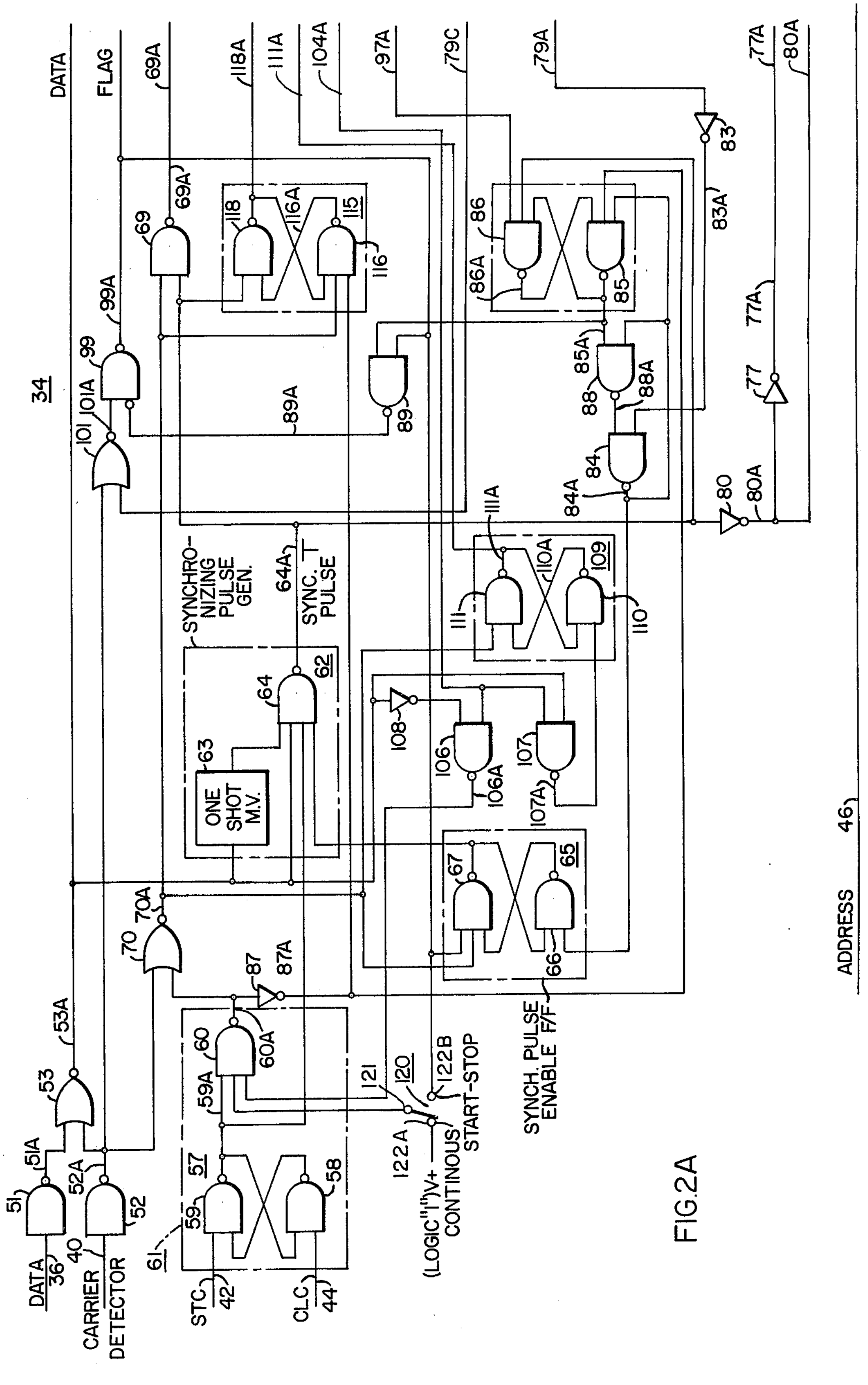
FIGS. 2A and 2B taken together comprise a logic circuit diagram of the data receiving input circuit shown in FIG. 1.
Figure 2B:
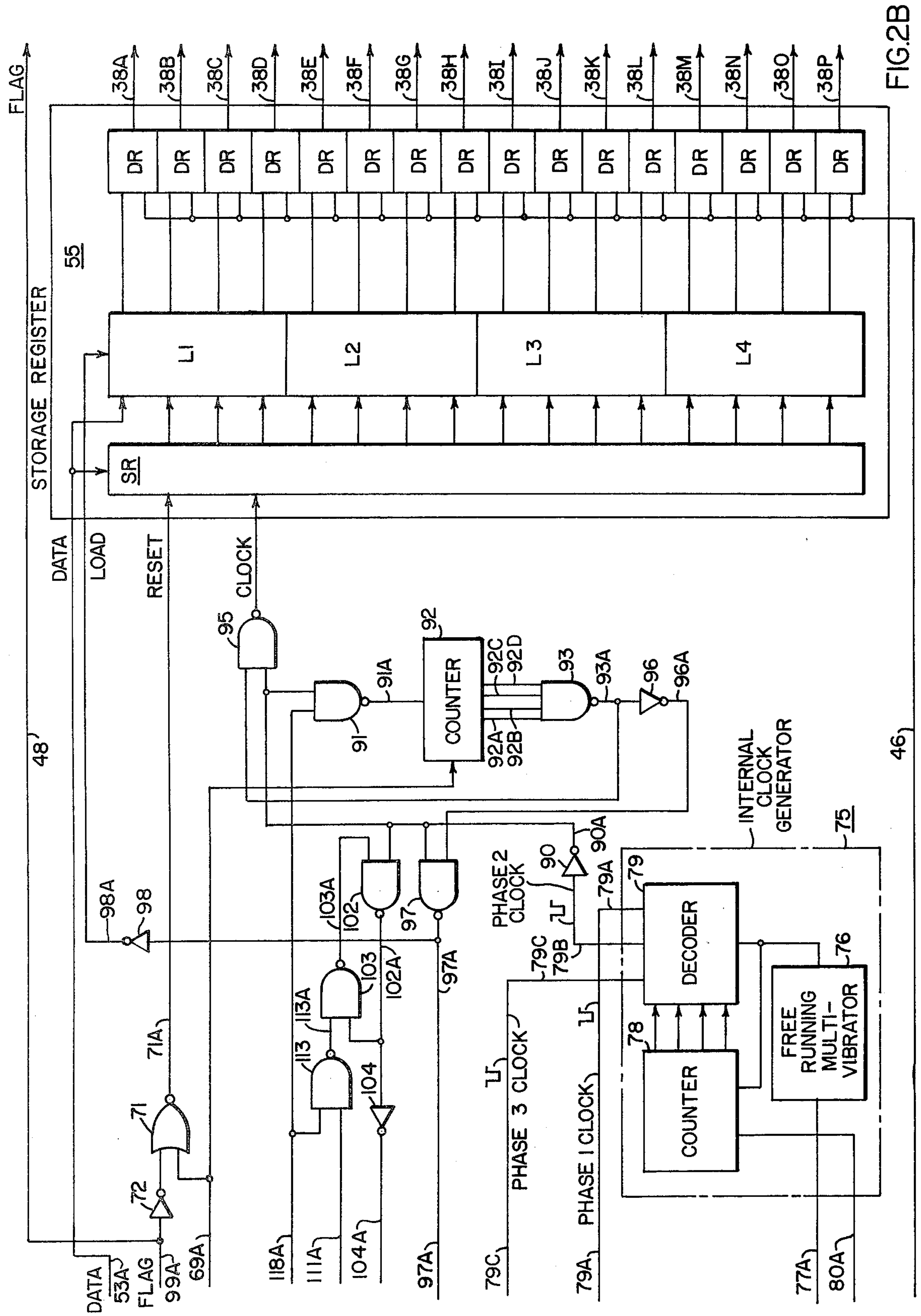

Referring now in detail to the data receiving input circuit 34 illustrated in the logic block circuit diagram of FIGS. 2A and 2B which is utilized to receive the data bit stream 12. The data words included in the bit stream 12 to be received by the input circuit 34, in one preferred embodiment, includes sixteen isochronous bit intervals in which the first or start bit interval has a 1 logic state and the sixteenth or end bit interval has a 0 logic state. When the binary encoded information between a start bit and the end bit includes the meter data of the associated meter, a meter identification code and a parity check bit interval preceding the end bit interval. Accordingly, the first data word of the bit stream 12 includes the meter information of the first meter and the last or Mth data word includes the meter information of the last meter M.

In one preferred embodiment, there are 288 meters and associated encoders which correspondingly have 288 data word outputs transmitted in the bit stream 12. With data words including sixteen bit intervals, a continuous stream of 4,608 bit intervals or bits of information is included in the bit stream 12 for a single readout. As noted hereinabove, the bit stream 12 is sent at a 60 hertz rate derived from a commercial power line conventionally furnished by electric utility companies. Accordingly, each bit interval is substantially 16.67 milliseconds within the normal tolerances of power line frequency variations. As noted further hereinbelow this variation may be in the order of 0.05% over short durations causing possible accumulated errors in the data bit intervals within the bit stream 12. This variation can result in the bit intervals being displaced such that beginning and end of adjacent data words in the bit stream 12 do not occur at exact regular intervals.

The circuits of the logic elements illustrated in the FIGS. 2A and 2B are of the conventional and well known designs and include NAND gates, NOR gates, inverter, and line receiver gate circuits. The data input line 36 applies the data bit stream to a line receiver gate 51 having an output 51A. The carrier detector signal on line 40 from the data set 31 is applied to a line receiver gate 52 having an output 52A. The gate 52 inverts the logic on the lines 36 and 40. The gate outputs 51A and 52A are applied to a two input NOR gate 53 having an output 53A which provides a data output corresponding to the data signals on the line 36. A storage register 55 has 16 stages to provide a temporary storage and the demultiplexer operation for translating the serial format of each data word into a parallel format for readout on the 16 data bit readout lines 38A through 38P indicated at the right hand side of FIG. 2B which correspond to the 16th through the first data bit intervals, respectively. The storage register 55 includes a shift register SR having data, clock and reset inputs, a latch circuit including latches L1, L2, L3 and L4 and output driver gates DR associated with each latch output. When the line 40 goes to the 1 state the gate 53 is enabled to supply the logic developed on the data input line 36 to the line 53A connected to the data input of the storage register 55.

The set control (STC) line 42 and clear control (CLC) line 44 are connected to a flip-flop circuit 57 formed by two, two input NAND gates 58 and 59 which are connected in a cross-coupled relationship with the output of the flip-flop provided by the output of the gate 59A of the gate 59. The STC signal 0 logic state produces a 1 logic state on the line 59A to enable the input circuit 34 to begin processing the data from the line 36. The output 59A is connected to one of the inputs of a three input NAND gate 60. A start circuit 61 is formed by the NAND gate 60 and the flip-flop 57 to provide either a start or a stop circuit function. For the stop function the input circuit 34 is rendered inactive when a 1 state is provided at the output 60A and for the start function the input circuit 34 is rendered active by the 0 state at the output 60A which can occur when a STC 0 state pulse signal is received on line 42.

A synchronizing pulse generator 62 includes a one shot multivibrator circuit 63 having an input connected to the line 53A so as to produce a 10 microsecond pulse when triggered by the 0 to 1 logic transition provided from the line 53A. The generator circuit 62 further includes a four input NAND gate 64 having one input connected to the output of the one shot multivibrator circuit 63. One enabling input to the NAND gate 64 is provided from the line 53A and a second enabling input is provided from line 59A. A synchronizing pulse generator enabling flip-flop circuit 65 includes NAND gates 66 and 67 and provides the third enabling control signal input to the synchronizing pulse generator gate 64 on the output 67A of the gate 67. Accordingly, after the input circuit 34 is turned on by the computer 32 at the STC input line 42 and after a 0 to 1 logic state has been applied to the line 40, a 0 to 1 logic transition on the line 36 causes a synchronizing pulse to be produced at the output 64A of the NAND gate 64.

The synchronizing pulse on line 64A is applied to a two input NAND gate 69 having an output 69A. The second input to the gate 69 is applied from a NOR gate 70 on the output 70A. The two inputs to the NOR gate 70 are connected to the lines 52A and 60A. The NOR gate 70 is normally enabled by the carrier detector signal on line 40 to enable the gate 69 to produce the synchronizing pulses on the output 69A which is connected to one of two inputs of a NOR gate 71. The output 71A of the gate 71 is connected to the reset input of the storage register 55. The other input to the gate 71 is applied from an inverter 72 connected to the flag signal output line 48. Accordingly, either a flag signal or a synchronizing pulse signal resets the storage register 55.

An internal multiphase clock pulse generator 75 including a free running multivibrator circuit 76 having an input connected to an inverter 77 and an output 76A connected to both a four count counter 78 and a decoder circuit 79 which produces three multiphase clock pulses designated phase 1, phase 2 and phase 3 clock pulses. The internal clock generator 75 produces pulses having a frequency of substantially four times the repetition rate of the data bit intervals included in the bit stream received at the data input 36. Accordingly, the 60 hertz rate of the data bit intervals requires the output frequency of the multivibrator 76 to be approximately 240 hertz.

The pulses from the multivibrator 76 are counted in the counter 78 so that a phase 1 clock pulse is the initial multiphase clock pulse and it appears at the output 79A of the decoder 79 at approximately one-fourth of the interval of a data bit interval. The phase 2 clock pulse output 79B occurs at approximately one-half of the interval or at the center of a data bit interval. The phase 3 clock pulse is a later or last multiphase clock pulse of each bit interval and it appears on the output 79C at approximately three-fourths of the interval of a data bit interval.

The synchronizing pulse generator 62 synchronizes the multivibrator 76 with the beginning of the start data bit interval as more clearly understood from a description hereinbelow. The synchronizing pulse output 64A is connected through an inverter 80 having an output 80A which is connected to the reset input of the counter 78. The input of the inverter 77 is connected to the output 80A of the inverter 80 for connection of its output 77A to the input of the multivibrator 76. The inverter output 77A provides a synchronizing input to the multivibrator 76 such that with each synchronizing pulse on the output 64A, a multivibrator pulse is initiated at the beginning of the synchronizing pulse and the counter 78 is simultaneously reset.

The phase 1, 2, 3 clock pulses have 0 logic states and the phase 1 clock pulses are applied through an inverter 83 to a two input NAND gate 84. The output 84A of the gate 84 applies the phase 1 clock pulse to the input of gate 66 of the enabling flip-flop 65. The gate output 84A is also coupled back to an input of a three input NAND gate 85 which with a three input NAND gate 86 forms a flip-flop circuit by having the output 86A connected to a second input of gate 85. A second input to the gate 86 is connected to the synchronizing pulse output 64A. The third input to the gate 85 is connected to the gate output 60A through an inverter 87. Output 85A of the gate 85 is also connected to a two input NAND gate 88 having the other input connected to the feedback circuit from output 84A. The output 88A of the gate 88 is connected to the second input of the gate 84 to complete the feedback arrangement of the gate 84 so as to assure that the phase 1 clock pulse is not missed. The phase 1 clock pulse from the output 84A is applied to the enabling flip-flop 65 to terminate the interval at the beginning of a data word during which a synchronizing pulse can be generated from the circuit 62. For purposes described hereinbelow the output 85A is connected to a two input NAND gate 89.

The phase 2 clock pulse on output 79B is connected through an inverter 90 having an input 90A for producing 1 state pulses to a two input gate 91 having an outout 91A connected to a counting input of a 16 count clock counter 92. The reset input of the counter 92 is connected to the gate output 69A. The clock counter 92 counts each of the phase 2 clock pulses and develops outputs on four output lines 92A, 92B, 92C and 92D. These latter named clock counter outputs are all applied to a four input NAND gate 93 having an output 93A which goes from the 1 state to the 0 state when the 15th phase 2 clock pulse is counted and returns to the 1 state when the 16th phase 2 clock pulse is counted.

The gate output 93A is connected to a two input NAND gate 95 having the other input connected to the phase 2 clock pulse inverter output 90A. The output of gate 95 is connected to the clock input of the storage register 55 so that the first through 15th phase 2 clock pulses sample the input data bit intervals at locations associated with the first 15 data bit positions of the storage register 55. Since the phase 2 clock pulses occur at the center of each data bit interval they are sampled at approximately the centers thereof by the clock input during the first 15 data bit intervals.

The gate output 93A is also connected to an inverter 96 having an output 96A connected to one of the two inputs of an input NAND gate 97. The other input to the gate 97 is connected to the phase 2 clock pulse inverter output 90A. The output 97A of the gate 97 produces a phase two clock pulse only at the 16th counted phase 2 clock pulse. The gate output 97A is connected to an inverter 98 having an output 98A connected to the latch load input of the storage register 55. A 0 state pulse at output 97A simultaneously loads the first 15 data bits in the shift register SR and the 16th or end data bit into the latch circuits L1, L2, L3 and L4. The data in the latches is held until after a flag signal on output 48 is generated and the computer 32 responds to signal on address output 46 to trigger the driver gates DR. The driver gates DR are enabled to transfer the data from the latch circuits in response to the computer address signal so that the outputs 38A through 38P pass the complete data word into the computer 32 in a parallel data word format to a predetermined location by programmed control of the computer 32.

The other output 97A of the gate 97 is applied to the third input to the flip-flop gate 86. The output 85A of the flip-flop gate 85 is normally gated from the 1 to the 0 state by a synchronizing pulse is provided when a first 0 to 1 state transition occurs at the data input line 36 due to an initial start of a data bit stream or a false start noted below or is repeatedly gated from the 1 to 0 state by each 16th phase 2 clock pulse. The output 85A returns from the 0 state to the 1 state at the beginning of the first phase 1 clock pulse developed thereafter on the clock output 79A. This output 85A is connected to one input of NAND gate 89 having an output 89A connected to a two input gate 99 having an output 99A connected to flag output line 48. A NOR gate 101 having an output 101A provides the other input of gate 99. One input to the NOR gate 101 is connected to the gate output 52A developed by the carrier detector logic on line 40 and the other input is connected to the phase 3 clock pulse output 79C. The 16th phase 3 clock pulse is normally gated through the NOR gate 101 and to the gate output 99A to produce the flag signal on the line 48. The flag signal indicates that the 16 data bit intervals associated with a single data word have been received by the storage register 55.

Referring again to the phase 2 clock pulse on output 90A, this output is connected to a two input NAND gate 102 having an output 102A connected to one input of a two input NAND gate 103 which has an output 103A coupled back to the other input of the gate 102. The output 102A is also connected to an inverter 104 having an output 104A which is connected to an input of each of two input NAND gates 106 and 107. The other input to gate 107 is connected to the output 53A of gate 53 on line 53A and the other input to the gate 106 is also connected to the gate output 53A through an inverter 108. The gate output 106A is connected to a second input of the gate 60 so as to normally initiate a 0 logic pulse with a first phase 2 clock pulse of the first data bit interval of an entire data bit stream and thereafter remain at the 1 state. If a spurious or false start logic occurs, as described in detail below, the gate 106 returns the input circuit 34 to a standby active condition.

The output 107A of the gate 107 is applied to a flip-flop circuit 109 having two cross-coupled NAND gates 110 and 111 with the output 111A of the gate 111 connected to a two input NAND gate 113. The other input to the flip-flop 109 at the gate 111 is connected to the gate output 70A. The output 111A of the flip-flop gate 111 normally goes from the 1 state to the 0 state at the phase 2 clock pulse of the first data bit interval of a bit stream and remains in the 0 state. The output 113A of gate 113 is connected to an output to gate 103 so that the output 113A and 103A change from the 1 to the 0 state and from the 0 state to the 1 state respectively with the output 113A returning to the one state at the beginning of the first phase 2 clock pulse and the output 103A returning to the 0 state at the end of the phase 2 clock pulse.

Referring now to the flip-flop circuit 115 formed by the NAND gates 116 and 118 and shown at the right hand side of the pulse generator 62, the output 118A of the gate 118 provides the flip-flop circuit 115 output which is connected to one of the inputs of the gate 113 and the other input to the gate 91. One of the two inputs to the gate 118 is from the synchronizing pulse generator output 64A and one of the three inputs to the gate 116 is from the gate output 60A as applied through the inverter 87 having the output 87A. The output of the gate 60 provides a stop control in response to a CLC signal applied on the line 44 from the clear control output of the computer 32. The output 87A signal is also applied as a stop control logic to the third input of the flip-flop gate 85. The third input to the NAND gate 116 is applied from a gate output 70A which goes to the 1 state at the beginning of the carrier detector logic signal on the line 40 and in the event of a false start produces a 0 logic pulse at the first phase 2 clock pulse. Accordingly, the flip-flop 115 output 118A enables the phase 2 clock pulses to be applied to the gate 91 and to the clock counter 92 and further sends the output 113A to the 0 state until the first phase 2 clock pulse occurs at the first bit of the bit stream 12. In this manner, when the condition occurs that a start bit doesn't extend for at least one half of a bit interval it provides a false start and the phase 2 clock pulses are inhibited from the counter 92. The gate 106 goes to the 0 pulse state during the phase 2 clock pulse if the data bit logic 1 does not extend past the time of the phase 2 clock at the first bit interval. The circuit is stopped by the gate 60 having a 1 state output pulse in response to this 0 state pulse and returns the circuit 34 to the stand-by active condition.

It is important to note that the output of the gate 99 which supplies the flag signal output also applies an input to the third input of the gate 67 in the enabling flip-flop 65. The synchronizing pulse generator gate 64 is enabled by the phase 3 clock pulse of the 16th data bit interval until the phase 1 clock pulse occurs during the next or start bit interval. Also, it is important to note that the gate output 69A is effective to reset the storage register 55 as well as reset the clock counter 92 in response to the synchronizing pulse.

The input circuit 34 includes a two position switch 120 for providing the two modes of operation designated continuous and start-stop. The switch arm terminal 121 is connected to a third input of the NAND gate 60. An input contact 122A associated with the continuous mode position is connected to a source of positive (+) voltage to establish a 1 state logic at the gate 60 input. The other input contact 122B is connected to the gate output 99A providing the flag signal. The switch arm is placed in the continuous position, connecting terminal 121 and the contact 122A, for isochronous data and in the start-stop position, connecting terminal 121 and the contact 122B, for the general type of asynchronous data noted above.

Referring now to the operation of the input circuit 34 when the system is set for receiving the data bit stream 12 including the serial isochronous data word bits under preprogrammed control of the computer 32. The switch arm of switch 120 is placed in the continuous mode position. A clear control signal (CLC) which is a 0 pulse is initiated at a time when the computer requests a data readout from the remote location 14. The data sets 24 and 31 establish a transmission link therebetween on the transmission line 26. The CLC logic pulse is applied to the input of the gate 58 and the flip-flop 57 is triggered to produce a 1 to 0 output on the output 59A. The output 59A should normally be at the 0 state therefore the CLC pulse does not change the flip-flop 57 and it is normally sent by the computer 32 to stop or render the input circuit 34 to an inactive state so that no more data will be received for processing. If the output 59A had been in the 1 state the CLC signal would have reset it to the 0 state. The CLC pulse produces a 1 to 0 logic change at the gate output 60A to inhibit the synchronizing pulse generator 62, the NOR gate 70 and the flip-flop gate 85 which is normally responsive to the phase 1 clock pulses. The computer 32 then sends a set control signal STC which is a 0 state pulse that produces a 1 state at the flip-flop 57 output 59A. This provides a 1 to 0 logic state transition at the output 60A of the gate 60 and, correspondingly, a 0 to 1 logic state transition at the inverter output 119A. The input circuit 34 is then conditioned to an initial condition in the active state to thereafter receive and continuously clock the data bit stream signals from the receiving data set 31 into the register 55.

A carrier detector signal is transmitted by the data set 31 to the line receiver gate 52 which output 52A goes to the 0 state and remains during the time for data transmission of the bit stream 12. The gate output 52A enables the gate 53 by going from a 1 state to the 0 state. The gate 70 has its output 70A go to the 1 state since its other input has gone to the 0 state with the STC signal. This produces a 1 to 0 transition at the output 69A of the gate 69 and a 0 to 1 transition at the output 71A of the gate 71 so as to apply reset logic to the storage register 55 and also to the clock counter 92.

The logic change at gate output 70A does not change the 1 state of the flip-flop output 111A at this time. Also, the output of the gate 52 which is applied to the NOR gate 101 is not material at this instance since the output of the gate 101 is connected to the gate 99 which output 99A develops the flag signal on the line 48 and remains at the 1 state.

The first data condition described is for a false start pulse which occurs when the first signal received is a short 1 state logic pulse which might result from spurious or noise signal sources. This pulse is applied to the data input line 36 and gate 51 which, in turn, produces a 1 pulse from the gate output 53A, which is applied to the data input of the storage register 55 to indicate the bit logic of a first data bit interval has been received. The gate output 53A is also initially sent to the synchronizing pulse generator gate 64 and concurrently the one shot multivibrator 63 produces a synchronizing pulse. The inverter output 108A provides a pulse input to the gate 106 but it is not gated through at this time. The synchronizing pulse generator 62 initiates a 0 state synchronizing pulse at the output 64A at this time in response to the logic change at the gate output 53A since the enabling flip-flop output 67A is at the 1 state.

The synchronizing pulse triggers the flip-flop gate 118 to enable the gate 91 connected to the input of the clock counter 92. This produces a 0 to 1 output at the gate output 103A to enable gate 102. Also, at this time the synchronizing pulse triggers the internal clock pulse generator 75 so that the multivibrator pulses are intially in phase with the beginning of a 0 to 1 logic transition at the data input 36. The phase 1, phase 2 and phase 3 clock outputs 79A, 79B and 79C are produced sequentially at the one-fourth, one-half and three-fourths intervals of a data bit interval. The phase 1 clock pulse is gated through the gate 84 which triggers the synchronizing pulse enabling flip-flop 65 so as to inhibit the synchronizing pulse generator gate 64.

The feedback loop portion of the gate output 84A reverses the state of the gate 86 and the other flip-flop gate 85 which does not effect the output of the gate 99 but the gate 85 is triggered by the phase 1 clock pulse sent back from the gate output 84A. This returns the output of the gates 86 and 85 to the 0 and 1 states, respectively. The output of the gate 87 returns to the 0 state at the end of the phase 1 clock pulse.

The phase 2 clock pulses then occur and are gated through the gate 91 to reset the clock counter 90 and through the gate 95 to the clock input to the storage register 55. The phase 2 clock pulse is not gated to the gate 97 but is gated through the gate 102 so as to be gated through the inverter 104 to gate 106. Since the spurious 1 state input pulse extended for less than one-half bit interval, the gate output 53A will be at the 0 as it was before the spurious or false start input pulse. This enables the gate 106 so the phase 2 clock pulse is gated to the gate 60. This doesn't occur when the first or start bit has the normal bit interval duration. The gate output 60A pulse is gated through the NOR gate 70 and the gates 69 and 71 to reset the clock counter 92 and the storage register 55. The phase 2 clock pulse also produces a triggering pulse at the flip-flop formed by the gates 116 and 118 to return the gate output 113A to the 1 state and the output of the gate 103 to the 0 state.

Thus, a false start (logic 1) pulse initiates a synchronizing pulse and the phase 1 and 2 clock pulses with later pulse returning the input circuit 34 to a standby or initial active state. The clock multivibrator continues to run but no circuit operations occur in the logic blocks shown in the circuit 34 in FIG. 2. The phase 3 clock pulse is not gated through the flip-flop gate 85 and the input circuit 34 is set to receive the first data word of a bit stream 12.

Referring now to when the start bit of the first data word of an isochronous transmitted bit stream 12 is received at the input circuit 34 after the circuit is conditioned in the standby active state so as to be ready for operating in the active continuous clocking mode. The data input line goes from the 0 state to the 1 state and the circuit initially operates as just described above except that the gate 106 is inhibited from gating the phase 2 clock pulse to the gate 60. The gate 53 produces the 1 state logic at the data input of the storage register 55 during the first or start bit interval. The gate output 53A initiates a synchronizing pulse on the output 64A as a 10 microsecond 0 state pulse to reset the clock pulse counter 92 and the shift register 55. The flip-flop gates 118 and 116 are triggered to the 1 and 0 output states respectively in response to the synchronizing pulse. The gate output 113A is gated to the 0 state and the gate output 103A is gated to the 1 state. The gate output 85A goes to the 0 state to cause the gate 87 to go to the 1 state, and the synchronizing pulse is applied through the inverters 80 and 77 to reset the clock pulse generator counter 78 and synchronize the output of the multivibrator 76 with the beginning of the start bit interval.

The phase 1, 2 and 3 clock pulses are initiated from the decoder 79 to continuously operate the input circuit 34. The phase 1 clock pulse is applied to the inverter 83 which is gated to the gate output 84A. The feedback of the output 84A returns the gate 85 to the 1 state and the gate 87 to the 1 state at the end of the pulse from the output 84A. The phase 2 clock pulse occurs at substantially the middle of the start bit interval and is gated as a 1 state pulse from the inverter 90. This pulse is gated through the gate 91 to be counted as a first pulse count in the clock pulse counter 92 and a pulse is gated through the gate 95 to the clock or input of the storage register 75 to sample and advance the count of the register by one count.

The phase 2 clock pulse is also applied to the gates 102 and 97 where it is gated through the gate 102 at the initial start bit of the bit stream 12 but not the later gate which will only gate the 16th counted phase 2 clock pulse of each data word. The inverter 104 gates a 1 state phase 2 clock pulse to the common pair of inputs of the gates 106 and 107. This triggers the output 111A of the flip-flop so that a 0 state is initiated. This triggers the gate output 113A to the 1 state and the gate output 103A goes to the 0 state at the end of the phase 2 clock pulse where it remains for the remainder of the bit stream.

The phase 3 clock pulse output of the internal clock generator 75 is gated through the gate 101 but the output of the gate 99 is inhibited until the 16th counted phase 3 clock pulse as described below. This clocking operation continues through the second through the 15th data bit intervals with the clock generator 75 developing the phase 2 clock pulses for increasing the count of the clock pulse counter 92 and clocking in the shift register data input during the middle of each data bit interval so as to be temporarily stored in the storage register 55.

When the 16th or end data word bit interval is reached its logic is always at the 0 state on the data input line 36. The 16th phase 2 clock pulse causes the 16th bit logic to be clocked directly into the latch circuit L1. The preceeding 15th count of the phase 2 clock pulses produces an output of the counter 92 so as to produce a 1 to 0 logic output of the gate 93 which remains until the 16th clock pulse is counted. This gate output 93A is inverted by the inverter 96 and applied to the gate 97. The 15th phase 3 clock pulse is not gated further than to the input of the gate 99. As the 16th phase 2 clock pulse, the clock counter 92 and shift register are updated as usual. The gate 97 gates the 1 state of the phase 2 clock pulse input since its other input is held at the 1 state by the output of the gate 93. The gate 93 returns to the 1 state at the end of the 16th phase 2 clock pulse so as to gate the 16th phase 2 clock pulse through the gate 97. The output 97A is applied to the inverter 98 at the latch load input of the storage register 55, to load the data stored in each of the storage register stages and be applied to the 16 output lines 38A through 38P of the storage register 55. The outputs of the flip-flop connected gates 85 and 86 are triggered to the 0 and 1 states, respectively. This triggers the output of the gate 88 to the 1 state.

The 16th phase 3 clock pulse is applied to the gate 101. The output of the gate 85 is at the 0 state so that the gate output 89A goes to the 1 state and causes the phase 3 clock pulse to be gated through the gate 99 to provide the flag signal to the computer 32 on output 48. The flag pulse is also gated to the inverter 72 and gate 71 to reset the storage register 55. The flag pulse also triggers the synchronizing pulse enabling flip-flop 65 so that the output 67A goes to the 1 state where it stays for one-half the length of a data bit interval during one-fourth the interval before and after the end of the 16th data bit interval to enable the synchronizing pulse generator gate 64.

If the 1 state of the next data word start bit interval is present, this logic on the data input line 36 is gated through the gate 53 to the storage register 55. This continuous mode of operation continues since the 1 state of the gate 53 generates the synchronizing pulse from the synchronizing pulse generator 62 on the output 64A to resynchronize the internal clock pulse generator 75 and clock-in 16 data bits into the storage register 55.

If the proper logic 1 is developed by the data input 36 while the synchronizing pulse generator 62 is enabled the multivibrator circuit 76 in the clock generator 75 is resynchronized and the clock pulse generator counter 78 is reset to begin the multiphase clock outputs from the clock generator 75. The phase 1 clock pulse returns the output of the gate 85 to the 1 state and is gated from the output of the gate 84 to the input of the synchronizing pulse enabling flip-flop 65 to terminate the 1 state logic by triggering the output of the flip-flop 65 to the 0 state on the line 67A. The output 88A of the gate 88 returns to the 0 state and thereafter the circuit operation is as described for the second data word bit interval through the 16th bit interval.

In the case where the 1 logic state is missing, during the one-fourth interval before and after the end of the 16th bit intervals, a synchronizing pulse will not be generated by the generator 62 and an unsynchronized continuous mode of operation develops in the input circuit 34 as described below.

In the event that the start bit interval does not have the initial logic 1 state to initiate the asynchronous mode of operation for receiving the next 16 data word bit intervals, the following mode of unsynchronized operation is provided. The gate 64 and the synchronizing pulse generator 62 remains enabled at the time the start bit logic 1 should initiate a synchronizing pulse output but will fail to do so in the absence of the start bit 1 logic on the output 53A. The internal clock pulse generator 75 continues operation since the multivibrator 76 continues to generate the pulses without being resynchronized and maintains control of the input circuit 34 for the next 16 bit intervals. The counter 92 restarts counting at the count of one since it has reached its maximum count of 16. The first phase 1 clock pulse is gated through the gate 84 to terminate the enabling logic state at the output of the flip-flop 65. The first phase 2 clock pulse is counted by the counter 92 and the shift register 55 samples for the first data bit interval. The data received for the data word having the missing start bit 1 logic is lost but the circuit is cycled through to the 16th or end bit interval as described above under control of the multiphase clock pulses from the clock generator 75. This maintains the clock pulses synchronized with the last previous data word having a start data bit.

The input circuit 34 will be resynchronized upon the next 1 bit logic occurring at the start bit position following a 0 state end bit. This permits the circuit to be conditioned for synchronization with the next data word start bit position every 16 bit intervals after processing a data word having a missing start bit. When the next start bit 1 logic occurs the input circuit 34 will commence operating as described above and therefore operate continuously.

It is important to note that the system will not resynchronize if, also, the end or 16th bit interval is at the 1 state rather than the 0 state. The logic state of the gate output 53A must provide a positive transition at the input to the one shot multivibrator 63 to trigger a pulse. Accordingly, a 0 state to 1 state transition is required between an end bit and a start bit to produce the synchronizing pulse at the output 64A of the pulse generator 62. The input circuit 34 is synchronized to the bit stream 12 upon the end of the 16th bit interval including a 0 logic state followed by a 1 logic state.

The above description is for the continuous mode of operation when the switch arm of the switch 120 is in the corresponding position engaging contact 122A as illustrated in FIG. 1. This operation, as described above, is required for the isochronous data bit transmissions. The start-stop mode of operation is provided when the switch arm of the switch 120 is in the alternate position engaging contact 122B. This is required when an asynchronous data transmission is being received with the end bit duration extending more than a single data bit interval. In one preferred embodiment, the data word format is the same as described for the isochronous except that the end bit duration of each data word extends from about one and one-half to two data bit intervals in the data bit stream.

With the switch 120 in the start-stop position, the switch contact 122B and the terminal 121 connect the flag signal output from the gate 99 to the input of the gate 60. This provides the same operation as described above for a false start condition when a pulse is initiated by the gate 106 to the gate 60. This returns the input circuit 34 to the stand-by condition so that further operation is stopped after an extended data bit is received. The start bit of the next data word restarts the circuit as described. In this mode any duration may occur between consecutive data words.

While a preferred embodiment of this invention is described hereinabove it is to be understood that modifications can be made within the spirit and scope of this invention.

What we claim is:

1. A decoder input including a data receiving circuit for maintaining synchronism with continuously received binary encoded data including regularly occurring start and end of word information subject to random omissions of said start information, said data receiving circuit, comprising:

data input means receiving an isochronous data bit stream characterized by a continuous series of binary coded data words having a common N number of data bits including start and end bits of first and second binary states, respectively, and wherein the interval of each data bit is subject to small variations relative to a predetermined data bit interval;

internal clock means continuously generating multiphase clock pulses in a predetermined order including first, second and third phase clock pulses consecutively occurring during an interval substantially equal to said predetermined data bit interval, and wherein said multiphase clock pulses have commonly adjustable phase relationships relative to each interval;

storage register means recurrently entering each of N data bit intervals occurring at said data input means under shifting control of said second phase clock pulses;

pulse counter means responsive to said second phase clock pulses and recurrently counting from a first count to an N number count of said second phase clock pulses;

logic control circuit means firstly responsive to said third phase clock pulses when coincident with said N number count of said pulse counter means and secondly responsive to said first phase clock pulses when coincident with a first count of said pulse counter means;

enabling circuit means developing an enabling pulse controlled by said logic control circuit means such that said enabling pulse extends between the consecutive occurrences of said firstly and secondly named responses of said logic control circuit means; and synchronizing circuit means generating a synchronizing pulse effective to coincidently adjust the phase relationships of said multiphase clock pulses in response to the transition from the second to the first binary state at said data input means when the last named transition is coincident with said enabling pulse such that the interval of each of said start data bits is synchronized with a second phase clock pulse at said storage register means and upon absence of one of said start bits the data word associated therewith is entered into said storage register in synchronism with the last previous data word containing a start data bit.

2. The decoder input including a data receiving circuit as claimed in claim 1 wherein said first, second, and third phase clock pulses have substantially equal time spaced relationships between the ends of each data bit interval such that said enabling pulse enables said synchronizing circuit means to initiate said synchronizing pulse for substantially one-half of said predetermined data bit interval during the end and start data bit intervals of consecutive data words.

3. The decoder input including a data receiving circuit as claimed in claim 2 including means generating a flag signal in response to said third phase clock pulse occurring during the end data bit interval of each data word such that said flag signal indicates receipt of N data bit intervals at the storage register means.

4. The decoder input including a data receiving circuit as claimed in claim 3 wherein the synchronizing circuit means includes a one-shot multivibrator circuit for producing a pulse in response to the transition from the second to the first binary state, and further includes a gating circuit means connected to said one-shot multivibrator circuit, the enabling circuit means, and the data input means for being initially enabled by the coincidence of the enabling pulse and the first binary state of the data bit stream at said data input means to produce the synchronizing pulse in response to the multivibrator pulse.

5. The decoder input including a data receiving circuit as claimed in claim 2 including start circuit means responsive to an external set control signal to operate the data receiving circuit from an inactive operative state wherein said data receiving circuit is inhibited from processing the data bits to said storage register to a standby active operative state wherein said data receiving circuit is enabled for initially receiving and accumulating data words prior to receiving said data bit stream being applied to said data input means whereupon said data receiving circuit is rendered to a data processing active operative state.

6. The decoder input including a data receiving circuit as claimed in claim 5 including a false start logic circuit means responsive to the coincidence of the occurrence of a second binary state at said data input means immediately following an initial momentary occurrence of a first binary state for less than substantially one half of said predetermined data bit interval and, upon the beginning of the occurrence of a second phase clock pulse so as to signal said start circuit means to render said data receiving circuit into said inactive operative state following the false start condition due to the first binary state signal which returns to said second binary state before said one second phase clock pulse occurs, and further wherein said false start logic circuit means returns said data receiving circuit to the standby active operative state at the end of said second phase clock pulse thereby conditioning the receiving circuit for initially receiving a first data word of a bit stream.

7. The decoder input including a data receiving circuit as claimed in claim 6 including further circuit means responsive to the third phase clock pulse occurring during an end data bit interval and further including switch means for selectively connecting and disconnecting said further circuit means to said start circuit means so that when said switch means connects said further circuit means to said start control circuit said further circuit means is effective in response to said last named third phase clock pulse to momentarily render said data receiving circuit to the inactive operative state and thereafter return the data receiving circuit to the standby active operative state, whereby, a bit stream including asynchronous data with an end data bit having a duration longer than a single data bit interval is receivable by said data receiving circuit so as to be enabled to said data processing active operative state.

8. The decoder input including a data receiving circuit as claimed in claim 6 wherein said predetermined data bit intervals of said bit stream have a sixty Hertz frequency rate.

9. The decoder input including a data receiving circuit as claimed in claim 8 wherein N is equal to 16.

* * * * *